United States Patent [19]

Draper et al.

[11] 3,719,200
[45] March 6, 1973

[54] VACUUM PUMPOUT AND PRESSURE RELIEF VALVE

[75] Inventors: James W. Draper, Morro Bay; Lowell N. Edwards, Los Osos, both of Calif.

[73] Assignee: Cryogenic Engineering Company, Denver, Colo.

[22] Filed: Feb. 25, 1971

[21] Appl. No.: 118,813

[52] U.S. Cl. ............... 137/315, 137/541, 220/25, 251/291
[51] Int. Cl. .............................................. F16k 43/00
[58] Field of Search ........ 137/315, 316, 329, 329.01, 329.04, 137/541, 542, 543.13, 543.15; 220/25; 251/291, 318, 321

[56] References Cited

UNITED STATES PATENTS

| | | | |
|---|---|---|---|
| 570,368 | 10/1896 | Beith | 220/25 |
| 956,082 | 4/1910 | Hannigan | 137/329.4 |
| 2,072,271 | 3/1937 | Meadows | 137/541 |
| 2,619,316 | 11/1952 | Wilson | 137/541 |
| 3,013,579 | 12/1961 | Gilliam | 137/541 X |
| 3,302,661 | 2/1967 | Williams | 251/291 X |

FOREIGN PATENTS OR APPLICATIONS

| | | | |
|---|---|---|---|
| 491,332 | 1/1919 | France | 220/25 |

*Primary Examiner*—Martin P. Schwadron
*Assistant Examiner*—David R. Matthews
*Attorney*—Griffin, Branigan & Kindness

[57] ABSTRACT

A relief valve assembly is part of a removable poppet kit which includes special mounting and removing tools. A removable-poppet assembly is compatible with a conventional operator and comprises a poppet and a Z-bar biased toward one another by a spring along a plunger. The removable-poppet assembly is mounted on a valve housing by clamping an axial shoulder of the valve housing between the poppet and the Z-bar. The tools include means for manually separating the poppet from the Z-bar, and a T-shaped tool for holding the poppet and Z-bar in a separated configuration so that the removable-poppet assembly can be removed or mounted.

19 Claims, 5 Drawing Figures

PATENTED MAR 6 1973

3,719,200

INVENTORS
JAMES W. DRAPER
LOWELL N. EDWARDS

BY *Guffey, Branigan & Henderson*
ATTORNEYS

VACUUM PUMPOUT AND PRESSURE RELIEF VALVE

BACKGROUND OF THE INVENTION

This invention relates generally to the art of relief valves and more particularly to relief valves having removable poppet assemblies.

A vacuum insulated storage vessel or transfer line normally includes an inner wall and an outer envelope, or container, forming an insulating vacuum space therebetween. A valve opening connecting the vacuum space with outside atmosphere is often provided for evacuating the vacuum space and relieving overpressures in the "vacuum space" when there is a leak in the inner wall. A valve which controls fluid flow through the valve opening must be compatible with a "valve operator", which holds the valve in a "throat open" configuration during pumpdown of the vacuum-space. Further, such a valve must provide a fast response in order to relieve even slight overpressures in the vacuum space. Consequently, it is an object of this invention to provide an improved pressure relief valve which is compatible with a simple valve operator for opening the valve during pumpdown of the vacuum space and which also has a fast response to relieve overpressures in the "vacuum space" to prevent rupture of the evacuated structure's walls.

A safety relief valve often comprises a valve housing and a poppet assembly. The valve housing is attached to a chamber—such as on the outer envelope of a vacuum space—and forms a conduit along which fluid flows into or out of the chamber. The poppet valve assembly includes a valve poppet which is biased to close off the chamber so that fluid flows through the housing only when fluid pressure force in the chamber overcomes the poppet biasing force.

Normally, the outer envelope, or container, and a valve housing are manufactured separately and then the valve housing is welded onto the container. In some prior art safety relief valves the poppet assemblies and valve housings are manufactured as units so that they are not readily separable from one another. In such cases the poppet assemblies are mounted on the valve housing when the valve housing is welded to the container. This is not desirable because poppet assemblies often contain heat sensitive elements such as "springs" and "O-rings" which can be damaged during the welding process.

Further, it is often desirable to replace seals and springs in poppet assemblies; and this is difficult to do when the poppet assemblies and valve housings are not readily separable.

Hence, other objects of this invention are to provide a safety relief valve kit including a poppet assembly which may be readily separated from a valve housing and special tools to aid in the mounting and dismounting of the poppet assembly on a valve housing.

Some prior art safety relief valves comprise poppet assemblies which are threadably mounted on valve housings. A significant shortcoming of such safety relief valves is that forming threads on the housings and the poppet assemblies increases manufacturing costs. It is therefore another object of this invention to provide a threadless safety relief valve which provides less expensive means for attaching a poppet assembly to a valve housing.

SUMMARY OF THE INVENTION

According to principles of this invention, a valve housing has an axially protruding shoulder at its outer end which forms a nozzle opening. A biasing spring biases the poppet downwardly against the outer end of the valve housing and biases a Z-bar upwardly towards the poppet against an inner side of the shoulder, thereby clamping the shoulder between the poppet and the Z-bar. To remove the poppet assembly from the valve housing a special handle is attached to the poppet, and the poppet is lifted manually. A T-shaped tool is inserted between the poppet and the Z-bar, thereby holding them separated. The poppet assembly is then rotated at an angle with the housing so that one end of the Z-bar clears the shoulder and the poppet assembly is removed. To insert the poppet assembly a tool plate is used to restrain the Z-bar as the Z-bar and poppet are manually separated and the T-shaped tool is again inserted between the poppet and the Z-bar. The poppet assembly is thereafter installed in the valve housing in an opposite manner from that described above. The valve housing and poppet assembly of this invention are compatible with a conventional "valve operator"; that is, the valve housing is of such a size and shape as to be mated with the "valve operator" and the poppet assembly is attachable to an operator shaft of the "valve operator."

BRIEF DESCRIPTION OF THE DRAWINGS

The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating the principles of the invention in a clear manner.

DESCRIPTION OF THE PREFERRED EMBODIMENT

Figure 1:
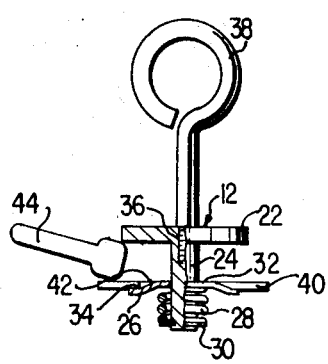
FIG. 1 is a partially cutaway elevation of a removable-poppet kit employing principles of this invention.

Referring now to FIGS. 1-4, the valve assembly of this invention comprises a valve housing 10 and a poppet assembly 12. The valve housing 10 has a tubular shape and is welded at its lower end to the outer wall 14 of a container such as the outer envelope of vacuum insulated transfer line. An inwardly protruding first shoulder 16 is located at the upper end of a valve housing bore 13 and forms a nozzle opening 18. A second shoulder 15 is located in the bore 13 adjacent to the first shoulder 16 and protruding to a lesser extent than the first shoulder 16. An O-ring 20 is mounted at the upper end of the valve housing 10.

Figure 3:
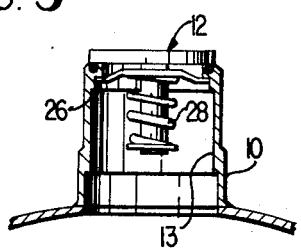
FIG. 3 is a partially cutaway elevation of a valve assembly employing principles of this invention when a poppet assembly is fully installed on a valve housing.
Figure 4:
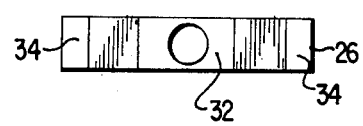
FIG. 4 is a top view of a Z-bar, shown in FIGS. 1-3.

The poppet assembly includes a poppet 22, a plunger 24, a Z-bar 26, a valve spring 28 and a spring retaining plate 30. In the illustrated embodiment, the plunger 24 is an integral part of the poppet 22 and acts to guide the poppet 22 as it opens and closes. The Z-bar 26 is slidably mounted on the plunger 24 and the spring retaining plate 30 is fixedly mounted at the lower end of the plunger 24, as seen in FIGS. 1 and 3. The valve spring 28 is also mounted on the plunger 24 and presses the spring retaining plate 30 and the Z-bar 26 away from one another; thus, the Z-bar 26 is biased toward the poppet 22.

The Z-bar 26 is rectangular in shape (see FIG. 4) but is bent so that its center portion 32 is closer to the poppet 22 than its outer ends 34.

The removable-poppet assembly 12, described above, is part of a removable poppet kit which also includes special tools for removing and mounting the removable poppet assembly. The tools, which are used to operate the poppet assembly 12, are shown in FIGS. 1 and 2.

The first tool is an eye bolt or handle 38, having male threads at its end which can be screwed into a threaded bore 36 in the poppet 22 to enable one to trip the poppet 22.

The second tool is a tool plate 40 which has an opening 42 therein. The tool plate 40 is used to restrain the Z-bar 26 as the handle 38 is used to pull the poppet 22 to an "open" position, as shown in FIG. 1.

Figure 2:
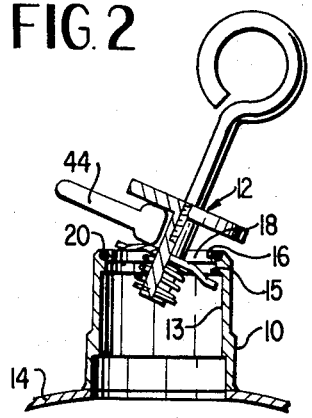
FIG. 2 is a partially cutaway elevation of a valve assembly employing principles of this invention wherein a T-shaped holding tool and a handle are being used to aid in mounting a removable-poppet assembly on a valve housing.

The third tool is a T-shaped holding tool 44 which is used as a block to hold the Z-bar 26 and the poppet 22 in a "separated" configuration as shown in FIG. 2.

Figure 5:
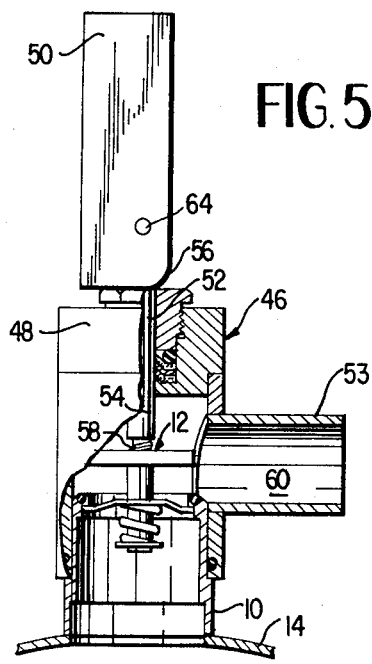
FIG. 5 is a partially cutaway elevation of a valve assembly employing principles of this invention with a valve operator also mounted thereon.

Referring now to FIG. 5, there is shown the valve housing 10 and the poppet assembly 12 employed in conjunction with a valve operator 46. The valve operator includes an operator housing 48, an operator handle 50, an operator shaft 52 and an operator tube 53 for communicating with a cavity 54.

The operator housing 48 forms the cavity 54 in which the valve housing 10 snugly fits. The operator handle 50 is rotatably attached to the operator shaft 52 at the top of the operator housing 48 and has an operator handle cam 56 at one end thereof which presses against the top of the operator housing 48 as the handle is rotated. The operator shaft 52 extends downwardly from the operator handle 50 and through the operator housing 48, into the cavity 54 to engage the male threads located at the lower end of the operator shaft.

To install a removable-poppet assembly 12 on a valve housing 10 the Z-bar 26 is placed under the tool plate 40 (FIG. 1). The eye bolt 38 is then screwed into the threaded bore 36 and used as a handle for manually pulling the poppet 22 away from the Z-bar 26. Once the poppet 22 and the Z-bar 26 are separated the T-shaped holding tool 44 is inserted between these two members thereby blocking the Z-bar from closing on the poppet 22. In this configuration the poppet assembly 12 is rotated to an angle as shown in FIG. 2 and one of the outer ends 34 of the Z-bar 26 is inserted through the nozzle opening 18 below the second shoulder 15. At this point, the opposite end 34 can also be pushed through the nozzle opening 18. The poppet assembly 12 is now rotated to a vertical position, as seen in FIG. 2. In this position the outer ends 34 of the Z-bar 26 clear the second shoulder 15 but are prevented from passing through the nozzle opening 18 by the first shoulder 16. The T-shaped holding tool 44 is then removed from between the Z-bar 26 and the poppet assembly 12 and the valve spring 28 clamps these two members together against the first shoulder 16. Finally, the eye bolt 38 is screwed out of the threaded bore 36 and the safety relief valve appears as shown in FIG. 3.

To remove the poppet assembly 12 from the valve housing 10 the above described procedure is reversed; however, the tool plate 40 is not needed.

The valve operator 46 shown in FIG. 5, is operated by pushing the operator housing 48 down onto the valve housing 10 so the valve housing 10 extends into the cavity 54 and forms a seal with operator housing 48. The male threads 58 of the operator shaft 52 are screwed into the threaded bore 36 (not shown in FIG. 5 but see FIGS. 1 and 2).

To evacuate a container—for example, in order to create a vacuum space in a cryogenic transfer line—the operator handle 50 is rotated about point 64 to a vertical position as shown in FIG. 5. In this manner cam 56 presses against the top of the operator handle 48 and thereby pulls the operator shaft 52 and the poppet 22 upwardly. Now the poppet assembly 12 is in a "throat open" position and fluid can be removed from, or inserted into the container 14 through the tube passage 60. To close the valve poppet 22 the operator handle 50 is rotated to a horizontal position.

It will be appreciated by those skilled in the art that the valve assembly described herein, including the valve housing and the poppet assembly with its associated tools, provide an uncomplicated mechanism for removing and installing a poppet assembly in a valve housing. In addition, the poppet assembly 12, because of its uncomplicated design, provides accurate overpressure relief; the sensitivity thereof being a function of the strength of the valve spring 28. Further, the valve assembly of this invention is compatible to a conventional valve operator and is suitable for use with all types of evacuated devices.

It can be further appreciated by those skilled in the art, that the invention disclosed herein has been particularly shown and described with reference to a preferred embodiment, however various changes in form and detail may be made therein without departing from the spirit and scope of the invention. For example, a "cap" may be added to the removable-poppet valve kit for protecting the poppet valve assembly 12 when it is mounted on the valve housing 10.

The embodiments of the invention in which an exclusive property or privilege are claimed are defined as follows:

1. A removable-poppet-assembly kit containing a poppet assembly of the type that can be selectively mounted on, or removed from, a valve housing, wherein said poppet assembly comprises:
   a poppet;
   a plunger means attached to said poppet for guiding the movement of said poppet;
   a spring means having first and second ends and being mounted on said plunger means for biasing said poppet toward a closed position;

a retaining means cooperating with said plunger for limiting movement of said first end of said spring means relative to said plunger; and, an assembly mounting means which is slidably mounted on said plunger for cooperating with said second end of said spring means to retain said poppet assembly on said valve housing, said assembly mounting means having such a shape that a relatively flat center portion thereof is closer to said poppet than outer extremities thereof.

2. A removable-poppet-assembly kit as claimed in claim 1 wherein is further included a blocking-tool means for blocking said assembly mounting means and said poppet apart from one another.

3. A removable-poppet-assembly kit as claimed in claim 2 wherein said blocking tool comprises an elongated shaft having a laterally extending flange at the end thereof.

4. A removable-poppet-assembly kit as claimed in claim 3 wherein is further included a handle, and said poppet includes a handle engaging means for engaging said handle.

5. A removable-poppet-assembly kit as claimed in claim 4 wherein said handle engaging means comprises a threaded bore and said handle comprises a threaded shaft which is engageable with said threaded bore.

6. A removable-poppet-assembly kit as claimed in claim 4 wherein is further included a tool plate means for temporarily restraining said assembly mounting means when said poppet is manually operated and said poppet assembly is not installed on said valve housing.

7. A removable-poppet-assembly kit as claimed in claim 6 wherein said tool plate means has an opening therein which is smaller than the width of said assembly mounting means.

8. A removable-poppet-assembly kit as claimed in claim 2 wherein is further included a handle and said poppet includes a handle engaging means for engaging said handle.

9. A removable-poppet-assembly kit as claimed in claim 8 wherein is further included a tool plate means for temporarily restraining said assembly mounting means when said poppet is manually operated and said poppet assembly is not installed on said valve housing.

10. A removable-poppet-assembly kit as claimed in claim 2 wherein is further included a tool plate means for temporarily restraining said assembly mounting means when said poppet is manually operated and said poppet assembly is not installed on said valve housing.

11. A removable-poppet-assembly kit containing a poppet assembly of the type that can be selectively mounted on, or removed from, a valve housing, wherein said poppet assembly comprises:

a poppet;

a plunger means attached to said poppet for guiding the movement of said poppet;

a spring means having first and second ends and being mounted on said plunger means for biasing said poppet toward a closed position;

a retaining means cooperating with said plunger for limiting movement of said first end of said spring means relative to said plunger;

an assembly mounting means for cooperating with said second end of said spring means to retain said poppet assembly on said valve housing; and, a blocking-tool means for blocking said assembly mounting means and said poppet apart from one another.

12. A removable-poppet-assembly kit as claimed in claim 11 wherein said blocking tool comprises an elongated shaft having a laterally extending flange at the end thereof.

13. A removable-poppet-assembly kit as claimed in claim 12 wherein is further included a tool plate means for temporarily restraining said assembly mounting means when said poppet is manually operated and said poppet assembly is not installed on said valve housing.

14. A removable-poppet-assembly kit as claimed in claim 13 wherein said tool plate means has an opening therein which is smaller than the width of said assembly mounting means.

15. A removable-poppet-assembly kit as claimed in claim 14 wherein is further included a handle and said poppet includes a handle engaging means for engaging said handle.

16. A removable-poppet-assembly kit as claimed in claim 15 wherein said handle engaging means comprises a threaded bore and said handle comprises a threaded shaft which is engageable with said threaded bore.

17. A removable-poppet-assembly kit as claimed in claim 12 wherein is further included a handle and said poppet includes a handle engaging means for engaging said handle.

18. A removable-poppet-assembly kit as claimed in claim 17 wherein said handle engaging means comprises a threaded bore and said handle comprises a threaded shaft which is engageable with said threaded bore.

19. A method of installing a poppet assembly of the type which includes a poppet and an assembly mounting means biased toward said poppet onto a valve housing of the type having an axially protruding shoulder forming a valve nozzle opening, said method comprising the steps of:

pulling said assembly mounting means apart from said poppet;

inserting a blocking means between said poppet and said assembly mounting means thereby holding them apart in a semipermanent manner;

rotating said blocked poppet assembly at an angle relative to said valve housing;

inserting one end of said assembly mounting means below said shoulder;

rotating said blocked poppet assembly to a straight position relative to said valve housing; and, removing said blocking means from between said poppet and said assembly mounting means.

* * * * *